2,996,536
2-HALO-2-METHYLCYCLOPROPANE-CARBOXYLATE

John A. Carbon, William B. Martin, and Leo E. Swett, Waukegan, Ill.
No Drawing. Filed July 7, 1958, Ser. No. 746,635
1 Claim. (Cl. 260—468)

This invention relates to novel compounds and to a process for their preparation.

The compounds prepared by the process hereafter disclosed are loweralkyl 2-halo-2-methylcyclopropane-carboxylates which are structurally presented as:

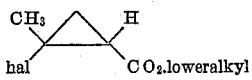

This compound is useful as a chemical intermediate in the preparation of a compound which is orally effective as a hypoglycemic agent; that is, a compound which reduces blood sugar.

The novel intermediate disclosed herein is useful in preparing a novel methylene derivative containing a double bond in a terminal position as disclosed in co-pending application, Serial No. 746,638, filed of even date herewith and now U.S. Patent 2,956,077. The methylene derivative, loweralkyl methylenecyclopropane-carboxylate, is reduced to methylenecyclopropanemethanol as revealed in co-pending application, Serial No. 746,636, filed of even date herewith and now U.S. Patent 2,921,966, and, thereafter, the alcohol is reacted with a p-substituted benzenesulfonyl halide to form a methylenecyclopropanemethyl p-substituted benzenesulfonate as disclosed in co-pending application, Serial No. 746,600, filed of even date herewith. The latter compound is reacted with a diloweralkyl formamidomalonate to form a diloweralkyl formamido-(methylenecyclopropylmethyl)malonate according to the manner presented in co-pending application, Serial No. 746,637, filed of even date herewith and now U.S. Patent 2,956,076. The active hypoglycemic agent, α-amino-methylenecyclopropanepropionic acid, is prepared by hydrolysis and decarboxylation of said malonate. The hypoglycemic agent is known in the literature as hypoglycin A.

Hypoglycin A is one of the components extracted from the fruit, Blighia sapida. This fruit is commonly known as Ackee. A second hypoglycemic component present in said fruit is known as hypoglycin B. Hypoglycin A has been widely investigated regarding its pharmacological and chemical properties. Physical and chemical constants of hypoglycin A and its hypoglycemic activity have been described by C. H. Hassall and K. Reyle in "Biochem. Journ.," volume 60, page 324 (1955) and "Nature," volume 173, page 356 (1954). The chemical structure of hypoglycin A was definitely established by C. V. Holt and W. Leppla in "Angewandte Chemie," volume 70, page 25 (1958).

The novel compounds of this invention are prepared by reacting a 2-halopropene, such as 2-chloropropene, 2-bromopropene and 2-fluoropropene, with about equimolar amounts of a loweralkyl diazoacetate, such as ethyl diazoacetate, propyl diazoacetate, etc. The mixture is refluxed in the presence of a copper salt or a copper-bronze powder or in the presence of both metal catalysts.

The compounds obtained from this process are present as a mixture of cis and trans isomers. The compound comprising unresolved isomers is useful as an intermediate in the process hereinbefore outlined, but it is intended that the isomeric forms as well as their mixture comprise a part of this invention.

The following example is presented as an embodiment of the process which produces the novel compound. It is not intended that said example be construed as an exclusive illustration.

EXAMPLE

Ethyl 2-bromo-2-methylcyclopropanecarboxylate

In a three-necked, round bottomed flask fitted with a mechanical stirrer, reflux condenser and dropping funnel is placed 200 ml. of re-distilled 2-bromopropene, 1.8 gms. of anhydrous copper sulfate and 0.5 gm. of copper-bronze powder. The stirrer is started and the mixture is heated to a gentle reflux. A solution of 164 gms. (1.44 mole) of ethyl diazoacetate in 200 ml. of 2-bromopropene is slowly added over an eight-hour period. Nitrogen is smoothly evolved throughout this addition. The reaction mixture is refluxed for an additional hour after the addition is complete, and, thereafter, cooled and filtered with suction. The filtrate is distilled first at atmospheric pressure to remove excess 2-bromopropene and then distilled under vacuum; the fraction boiling at 70–90° C., 12 mm., $n_D^{25}$ 1.4538, is retained as crude product in a yield of 84.7 gms. This material is mixed with 250 ml. of water, cooled in an ice bath and powdered potassium permanganate is added in small portions until a permanent violet color is obtained. This requires about 42 gms. of potassium permanganate. Excess permanganate is destroyed by the addition of 2 gms. of sodium thiosulfate, and the mixture is filtered with suction. The cake of manganese dioxide obtained is washed with water and then with ether. The filtrate is extracted with three portions of ether and the combined ether extracts are dried over anhydrous magnesium sulfate. The ether is removed in vacuo and the residual, colorless oil is vacuum distilled through an efficient column. Ethyl 2-bromo-2-methylcyclopropanecarboxylate is obtained as a colorless oil, B.P. 71–86° C. at 11 mm.; $n_D^{25}$ 1.4653–1.4666. The product is obtained in a yield of 51 gms. (17%).

Anal. Calcd. for $C_7H_{11}BrO_2$. Calculated: C, 40.59%; H, 5.36%; Br, 38.59%. Found: C, 40.88%; H, 5.14%; Br, 38.42%. The ethyl 2-bromo-2-methylcyclopropanecarboxylate obtained in the foregoing example occurs in the cis and trans forms. These forms can be resolved by careful fractionation according to standard techniques well known in the art.

Others may practice the invention in any of the numerous ways which will be suggested by this disclosure to one skilled in the art. All such practice of the invention is considered to be a part hereof provided it falls within the scope of the appended claim.

We claim:
Ethyl 2-bromo-2-methylcyclopropanecarboxylate.

References Cited in the file of this patent
UNITED STATES PATENTS 2,727,900 Shukys et al. _____ Dec. 20, 1955

OTHER REFERENCES

D'yakonov et al.: Chem. Abst., 49, 882–3 (1955).
Crombie et al.: J. Chem. Soc., 2750–1 (1957), QD/1/C6.